United States Patent [19] [11] 4,230,733
Tilby [45] Oct. 28, 1980

[54] METHODS AND APPARATUS FOR EXTRACTING JUICE FROM PLANT MATERIAL

[75] Inventor: Sydney E. Tilby, Victoria, Canada
[73] Assignee: Intercane Systems, Inc., Ontario, Canada

[21] Appl. No.: 985
[22] Filed: Jan. 4, 1979
[51] Int. Cl.² .......... A23L 1/28
[52] U.S. Cl. .......... 426/429; 426/425; 100/37; 100/116; 100/223
[58] Field of Search .......... 426/425, 429, 431; 100/116, 221, 223, 37

[56] References Cited

U.S. PATENT DOCUMENTS

| | | | |
|---|---|---|---|
| 1,071,020 | 8/1913 | Bartholomew | 100/116 |
| 2,904,835 | 9/1959 | Thomas | 100/116 X |
| 3,992,905 | 11/1976 | Oberley et al. | 100/223 X |

*Primary Examiner*—Arthur D. Kellogg
*Attorney, Agent, or Firm*—Burns, Doane, Swecker & Mathis

[57] ABSTRACT

A juice extractor comprises a carrier defining a plurality of circumferentially spaced extracting stations. The carrier includes a reciprocable plunger at each station. A rotary head is mounted for rotation within the carrier and includes a plurality of cells alignable with the extracting stations. The cells are arranged to carry charges of plant material. An indexing mechanism rotates the head in step-by-step fashion to sequentially align the cells with successive ones of the extracting stations. The plungers are extended into compression relationship with plant material in the cells to express juice.

23 Claims, 22 Drawing Figures 26B
30
52E
10
26A
12
14
29E
160
154
164
156
34
152
158
50E
54E
32E
152
136
32A
138
140
154
29B
58
26
28
90
30
24

106
178
5
120
26B
169
D
164
156
E
110
160
168
C
104
158
A
102
112
B
24
5

Fig. 7
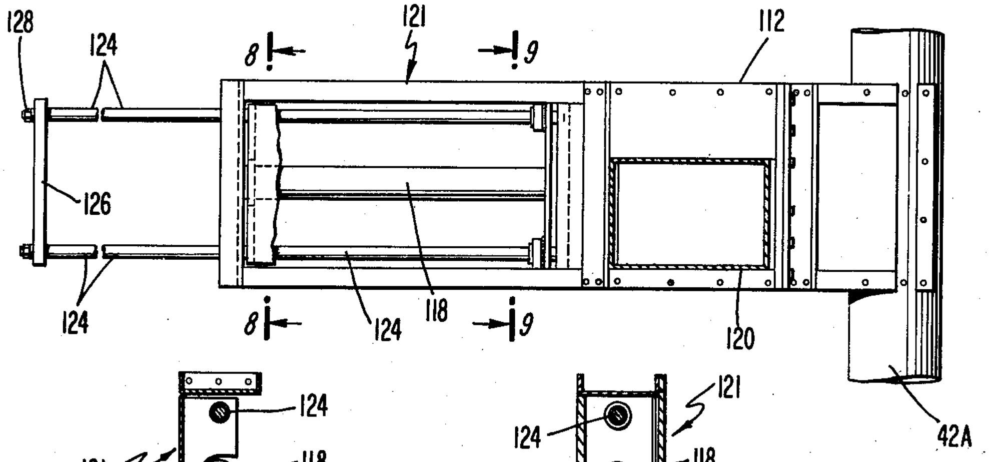
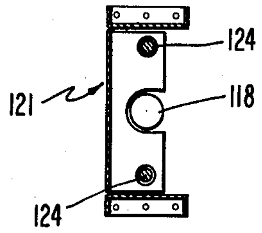
Fig. 8
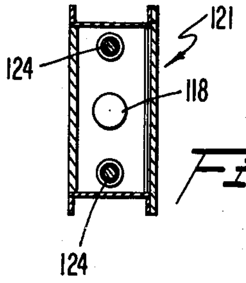
Fig. 9
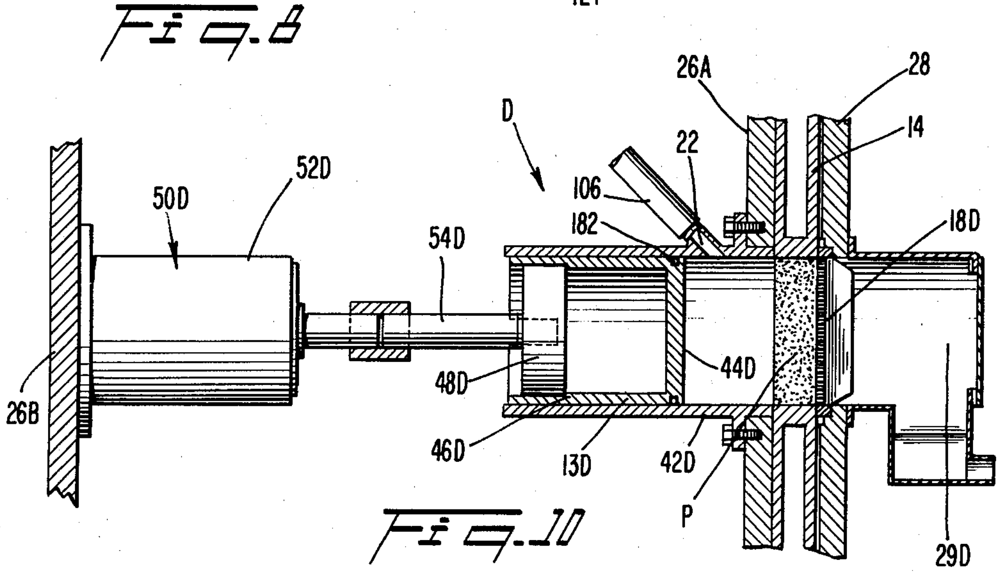
Fig. 10

Fig. 11
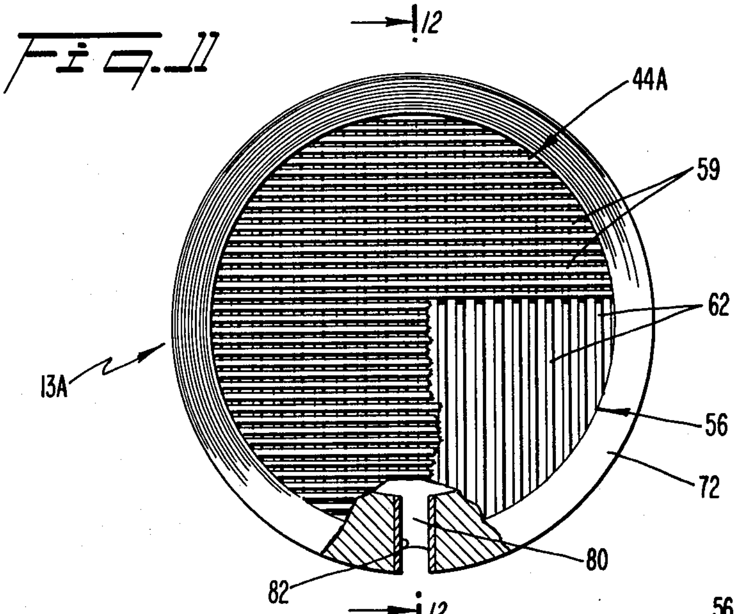
Fig. 12
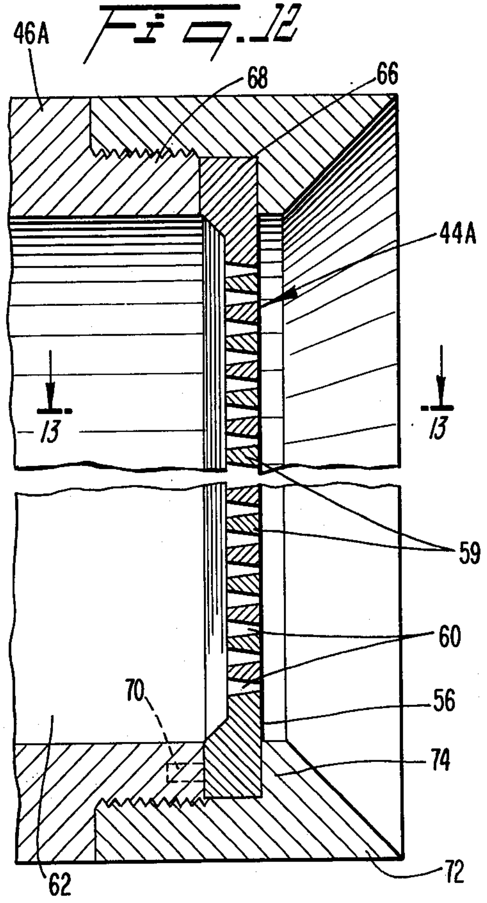
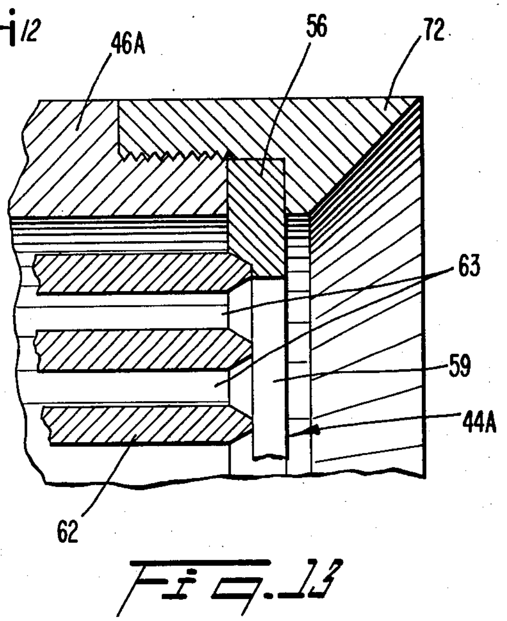
Fig. 13

METHODS AND APPARATUS FOR EXTRACTING JUICE FROM PLANT MATERIAL

BACKGROUND AND OBJECTS OF THE INVENTION

Many plants contain commercially valuable juices. For example, many stalks comprise an outer rind component and a soft pithy central component, both of which may contain valuable juices. It has been heretofore proposed to extract juices from such components by techniques involving squeezing and/or soaking of the plant material.

For example, in U.S. Pat. No. 4,101,285, issued to the present inventor on July 18, 1978, a series of baskets are mounted in troughs of liquid. A charge of plant material is introduced into each basket and allowed to soak in the liquid for a preset period. Thereafter, the basket is raised from the associated trough and squeezes juice from the charge of plant material, and finally dumps the charge into a succeeding basket where the treatment is repeated.

In U.S. Pat. No. 3,693,540 issued to Dombrine on Sept. 26, 1972 plant material is placed within a container, and a cover is secured so as to compress the plant material. The container is then passed through a succession of diffusion stations wherein water is conducted through the compressed plant product.

Notwithstanding the prior art proposals in this area, substantial room for improvement remains. For example, many previous proposals involve equipment which is expansive, requiring a large working area and involving many moving parts that are subject to malfunction.

Therefore, it is an object of the present invention to provide novel methods and apparatus for extracting juice from plant materials.

Another object of the invention is to provide novel juice extracting methods and apparatus which effectively combine squeezing and immersion actions.

A further object of the invention is to provide novel juice extracting methods and apparatus which provide for the recovery of pure juice and a secondary recovery of diluted juice.

An additional object of the invention is to provide a simplified, compact juice extracting apparatus which is able to handle relatively high volumes of plant material.

BRIEF SUMMARY OF THE INVENTION

These objects are achieved by the present invention involving a carrier mechanism carrying a plurality of movable compression members forming a plurality of stations. The compression members are movable between a compression position and a rest position. A head includes a plurality of cells for receiving plant material. An indexing mechanism effects relative movement between the carrier mechanism and the head mechanism to sequentially position the cells at successive ones of the stations. Thereafter the movable compression members are moved into their compression positions in pressing relationship with plant material in the respective cells to express juice therefrom.

THE DRAWING

These and other objects of the present invention will become apparent from the following detailed description of a preferred embodiment of the invention in connection with the accompanying drawings in which like numerals designate like elements and in which:

FIG. 7 is a plane view of a product injecting mechanism according to the present invention;

FIG. 8 is a cross-sectional view taken along line 8—8 of FIG. 7;

FIG. 9 is a cross-sectional view taken along line 9—9 of FIG. 7;

FIG. 10 is a cross-sectional view taken along line 10—10 of FIG. 2;

FIG. 11 is a front elevational view of an initial extractor plunger according to the present invention, with a portion thereof broken away;

FIG. 12 is a longitudinal sectional view through the initial extractor plunger taken along line 12—12 of FIG. 11;

FIG. 13 is a sectional view taken along line 13—13 of FIG. 12;

FIG. 18 is a sectional view taken along line 18—18 of FIG. 17;

DETAILED DESCRIPTION OF PREFERRED EMBODIMENTS OF THE INVENTION

Figure 4:
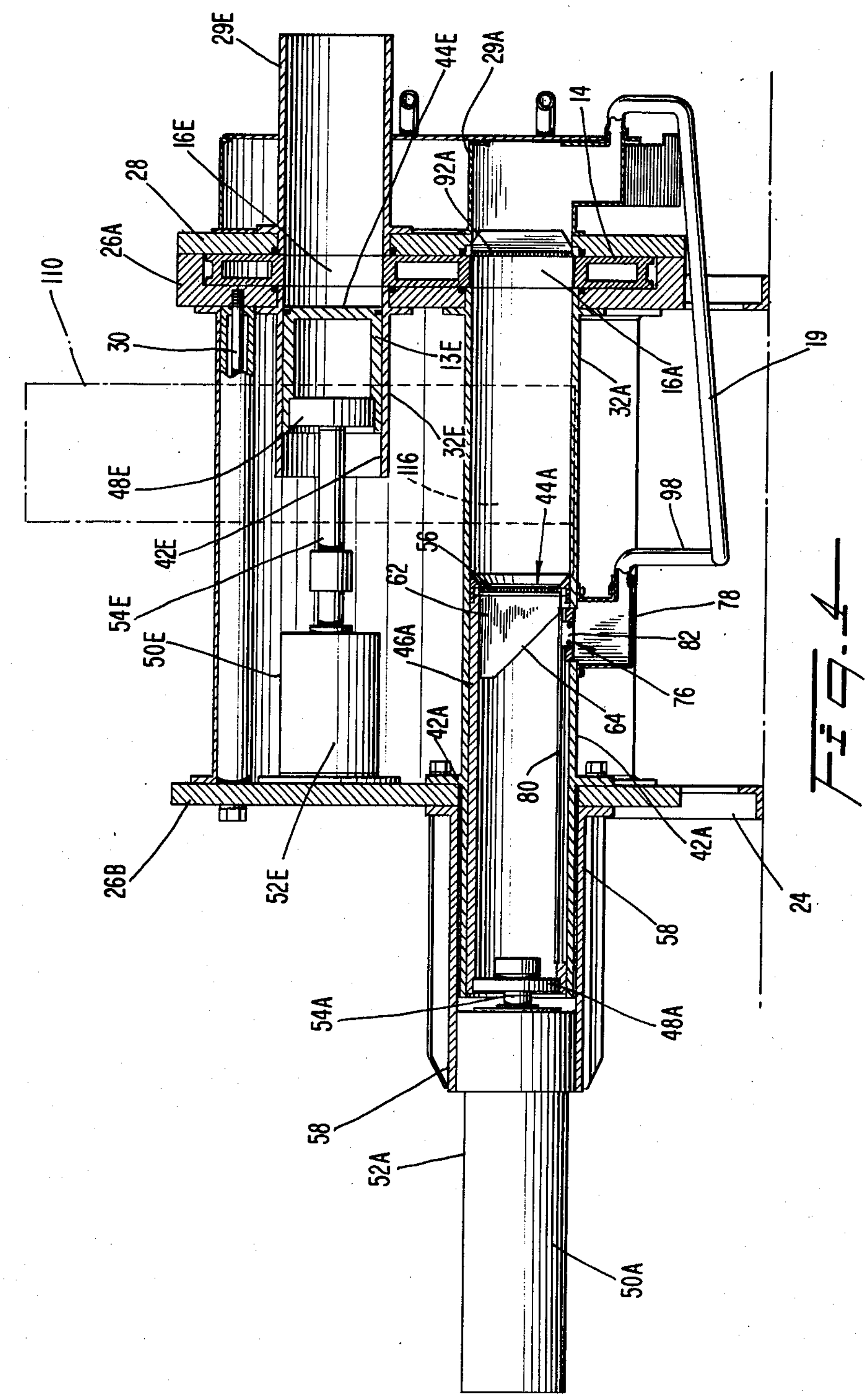
FIG. 4 is a longitudinal sectional view taken along line 4—4 in FIG. 2.
Figure 5:
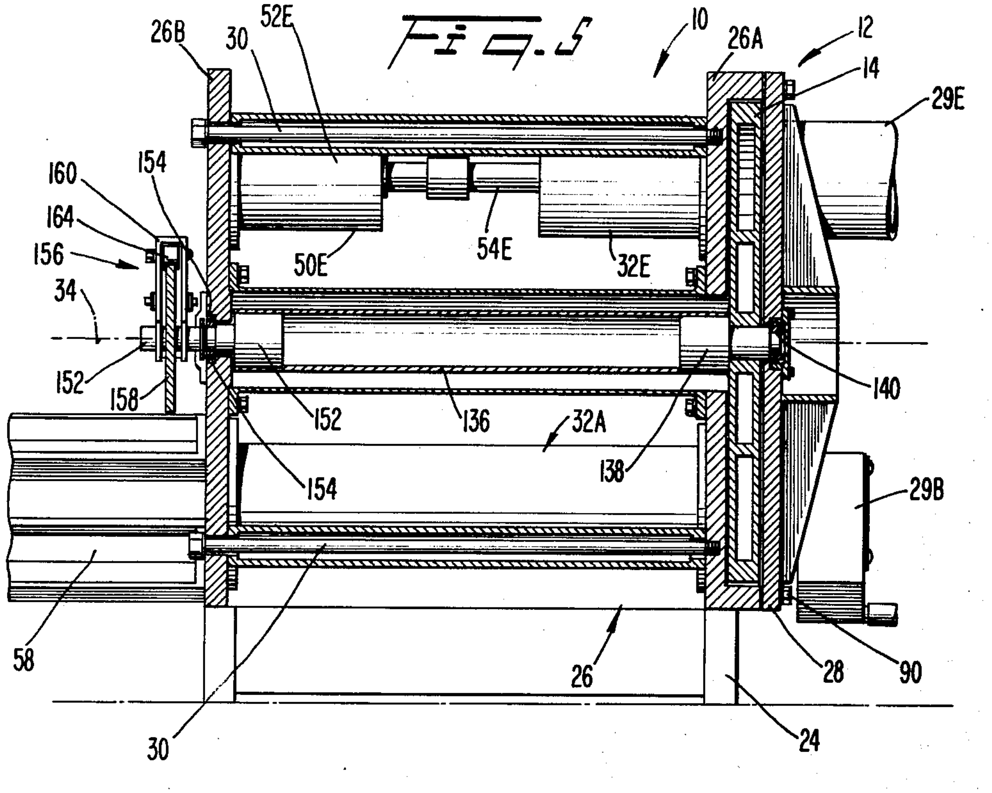
FIG. 5 is a longitudinal sectional view taken along line 5—5 of FIG. 6.
Figure 6:
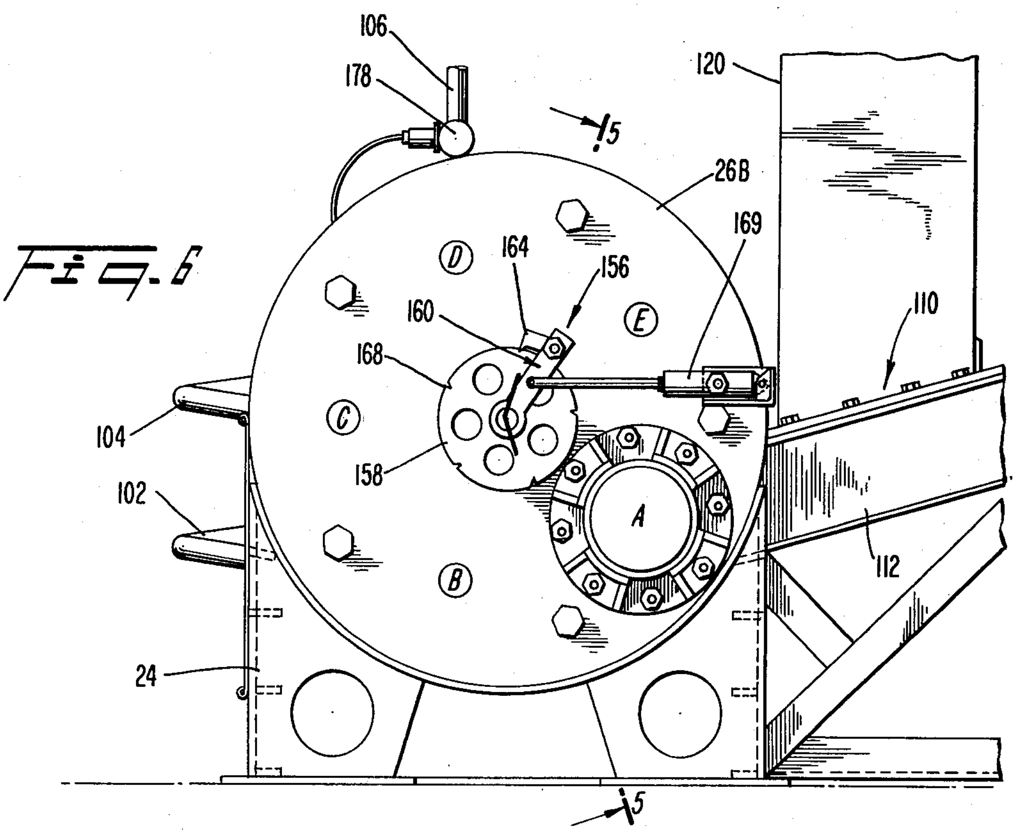
FIG. 6 is an end elevational view of the juice extracting mechanism.

A juice extractor 10 according to the present invention will initially be discussed briefly in connection with FIGS. 1, 2, 3, and 5. The extractor 10 comprises a stationary housing 12 containing a plurality of juice extracting stations A, B, C, D and a product discharge station E. Each extracting station A–D includes a squeezing mechanism in the form of a reciprocable plunger 13A, B, C, D, as will be discussed in more detail. Mounted on the housing 12 for rotation relative thereto is a rotary head 14 (FIG. 5). The head 14 includes a plurality of open-ended cells 16 (FIGS. 3,4,10) adapted to receive a charge of plant material, or product, to be treated. By intermittently rotating the head 14, each cell can be aligned successively with the extracting stations A, B, C, D, whereupon the plungers 13A–D are actuated to compress the product against a backing screen and squeeze juice therefrom.

At the initial extracting station A pure juice is expressed from a charge of product. At subsequent extracting stations B–D, imbibition liquid is forced through the charge during the squeezing step to aid in extracting residual juices therefrom. At the discharge station E, the exhausted charge is discharged from the extractor.

Figure 3:
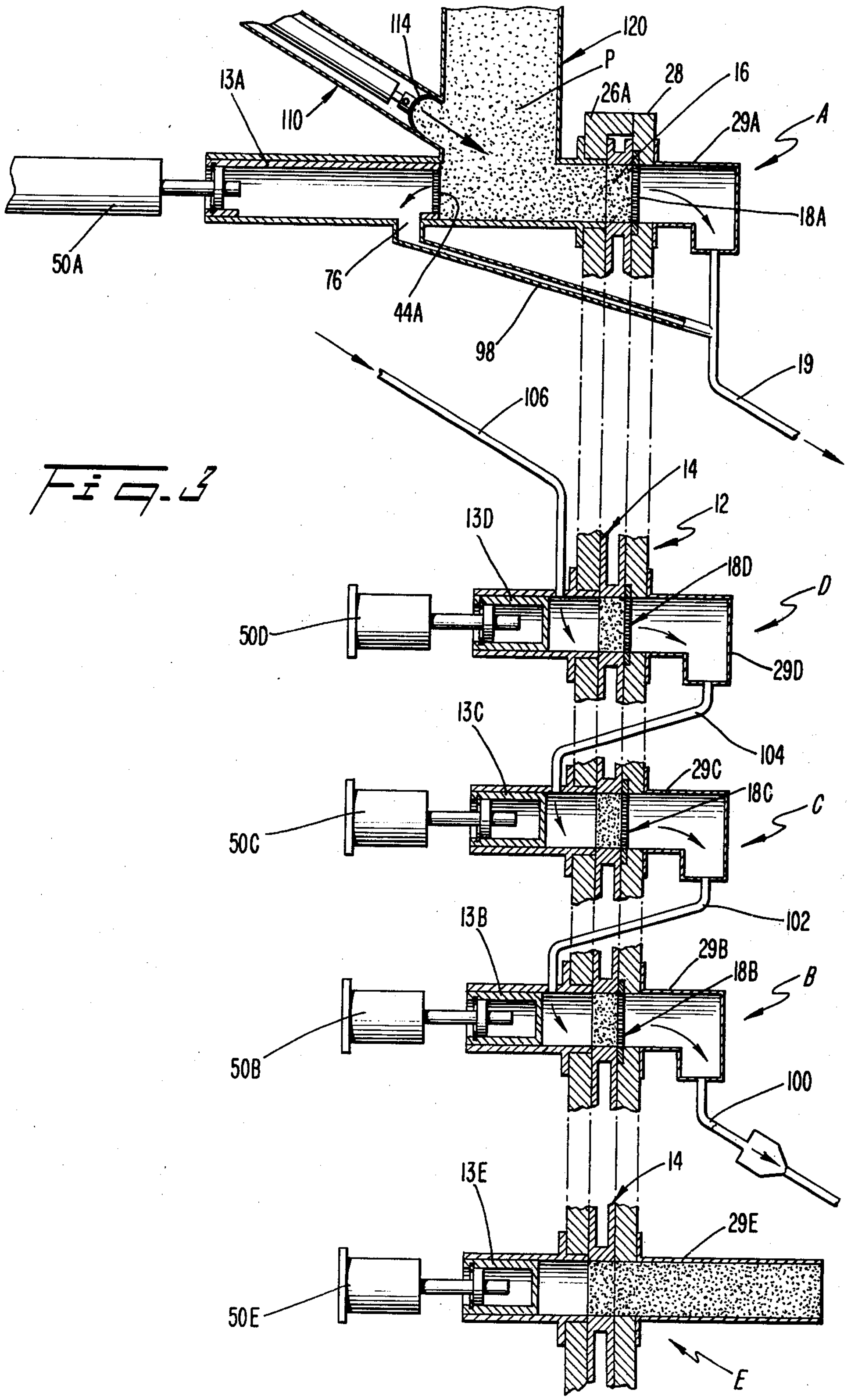
FIG. 3 is a schematic view representing the sequence of operation of the mechanism.

The above-described sequence of operation is depicted schematically in FIG. 3. At the initial extracting station A a charge 10 of product is introduced into alignment with the first plunger 13A. Thereafter, the plunger 13A is extended to push the charge into the associated cell 16 and compress it against a first backing screen 18A, whereupon pure juice is squeezed from the product and into a discharge conduit 19. The compression surface of the first plunger 13A comprises a screen-like member 20 which allows expressed juices to travel through the plunger and to the discharge conduit 19, as will be discussed later in greater detail.

Thereafter, the rotary head 14 is rotationally indexed to bring the cell 16 successively into alignment with the second, third and fourth extracting stations B–D.

At each of these subsequent extracting stations B–D imbibition liquid is forced through the charge by a plunger to express residual juice. In this regard, attention is directed to the fourth extracting station D (FIGS. 3 and 10) wherein fresh imbibition water is introduced ahead of a plunger 13D via inlet 22. Upon extension of the plunger 13D, the liquid is forced through the product P and expressed from the opposite side through a screen 18D. That expressed liquid/juice mixture is then conducted to the third extracting station C for addition to the next charge acted upon at that station. After being forced through the charge in the third station C, the liquid (now having a higher juice concentration) is conducted to the second extracting station B where it is forced through the charge therein. Finally, the spent plant material is discharged from the machine at the station E. Accordingly, it is apparent that the imbibition liquid travels counter to the travel path of the charge (i.e., the liquid travels from the fourth station to the third station and thereafter to the second station), with the juice concentration thereof progressively increasing.

The invention will now be described in greater detail.

The stationary housing 12 (FIG. 5) comprises a base 24 and first and second carriers 26, 28, the rotary head 14 being rotatably supported between the carriers. The first carrier 26 carries the plurality of plungers 13A–E, while the second carrier 28 carries a plurality of liquid outlet chambers 29A–D for receiving and conducting expressed juices and a charge outlet chamber 29E for receiving spent product.

The first carrier 26 comprises a pair of spaced inner and outer plates 26A, 26B which are connected together by annularly spaced connecting rods 30. Connected to the inner plate 28A are a plurality of plunger-receiving cylindrical compartments 32A–D (FIGS. 3–5) arranged in circumferentially spaced fashion and each extending parallel to the longitudinal axis of rotation 34 of the rotary head. Each compartment 32A–D is aligned with one of the liquid outlet chambers in the second carrier. The rotary head 14 comprises a pair of opposed discs 36, 38 (FIGS. 5, 18) and longitudinal wall segments 40 joining the discs 36, 38 to form the plurality of circular cells 16. The quantity and arrangement of those cells 16 corresponds to that of the compartments 32A–D and chambers 29A–D so that the cells can be simultaneously aligned with the compartments and chambers.

The compartments 32B, C, D, E of the second, third, fourth and fifth stations B–E comprise tubes 42B–E attached to the inner plate 26A and extending part-way to the outer plate 26B. The plungers 13B–E are mounted for reciprocal movement within those tubes. Each plunger comprises a compression wall 44B–E at one end of a cylindrical skirt 46B–E, and a base wall 48B–E at the other end of the skirt 46A–E. Fluid-actuated rams 50B–E, preferably of the hydraulic fluid-actuated type, have their cylinder ends 52B–E mounted to the outer plate 26B and their rod ends 54B–E mounted to the base walls of the associated plungers.

The first extracting station A includes a compartment formed by a tube 42A extending from the inner plate 26A to the outer plate 26B and beyond the latter. The plunger 13A is mounted for reciprocal movement within the tube 42A. The plunger 13A comprises a compression wall 44A in the form of an apertured screen 56 (FIG. 12), a cylindrical skirt 46A extending from the screen 56, and a base wall 48A at the opposite end of the skirt. A fluid-actuated ram 50A (FIG. 4) has its cylinder end mounted to a flange 58 bolted to the outer plate 26B, and its rod end 54A connected to the base wall 48A of the plunger 13A.

The apertured screen 56 comprises a plurality of spaced bars 59 which form elongate slots 60 that are tapered toward the rotary head 14, i.e., the slots are smaller at their ends closest to the cells 16. Alternatively, small tapered holes could be provided in lieu of slots. Disposed behind the screen, within the skirt 46A, are a plurality of screen support plates 62 which form slits 63 oriented at right angles relative to the slots 60 of the screen. The support plates include inclined rear edges 64 (FIG. 4) and can be rigidly attached to the skirt in any convenient manner such as by welding for example. The screen 56 includes a peripheral flange 66 which abuts against a front end 68 of the skirt 46A. The screen 56 may carry locating pins 70 which fit into corresponding holes in the skirt to assure proper orientation of the slots. A collar 72 is threadedly connected to the front end of the skirt 46A and includes a radially inwardly extending lip 74 which engages the screen 56 and holds it in place.

It will be apparent that when the initial plunger 13A compresses a charge of product, some of the juices in the latter flow through the screen 56 in the plunger 13A. To collect such juices an opening 76 is provided in the tube 42A and a duct 78 is mounted at that opening 76. To conduct juice from the screen 56 to the opening 76 a longitudinal slit 80 (FIG. 11) is provided in the tube 42A which communicates with the opening 76. A plurality of radially projecting guide elements 82 are mounted on the tube 42A and are slidably received in the slit 80 to prevent the occurrence of relative rotation between the plunger 13A and the tube 42A.

The tapered nature of the slots 60 promotes clog-free passage of juice. That is, if solid particles enter the inlet of the slots 60, the diverging nature of the slot walls facilitates passage of the solids completely through the slots. Thus, any tendency for solids to accumulate within, and thereby clog, the slots is resisted.

Figure 14:
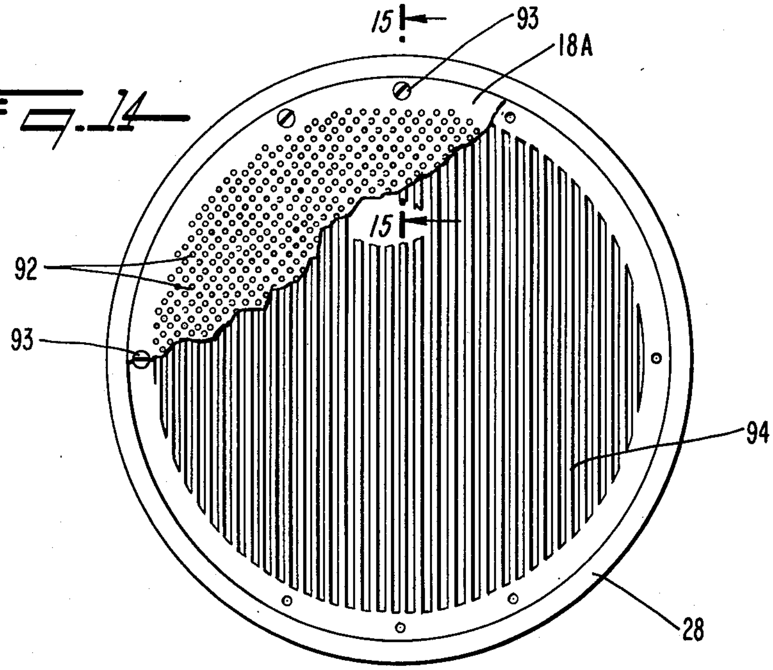
FIG. 14 is a front elevational view of a screen against which each charge of plant material is compressed during an extraction step, with a portion thereof broken away.
Figure 15:
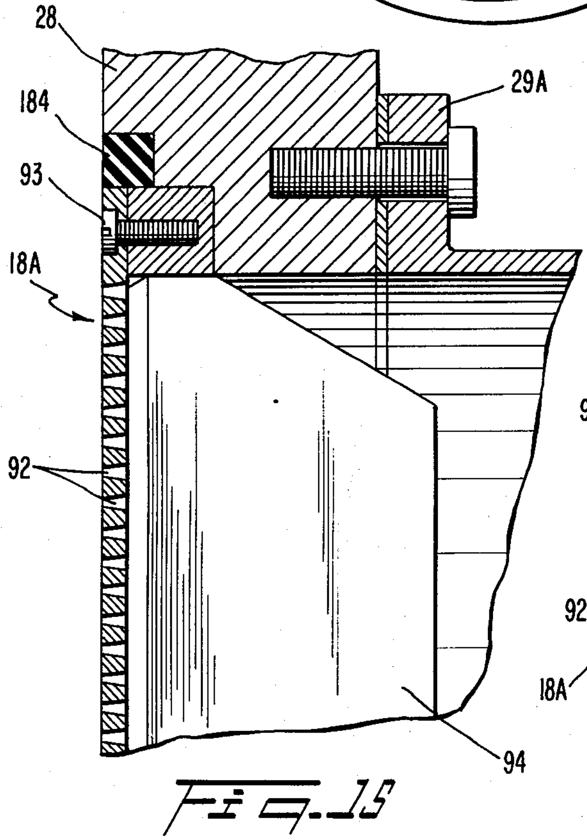
FIG. 15 is a sectional view taken along line 15—15 of FIG. 14.
Figure 16:
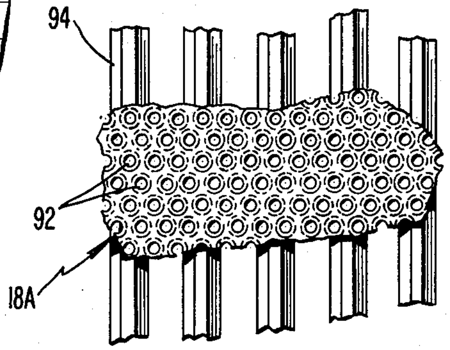
FIG. 16 is a schematic view, viewing the screen of FIG. 14 from the front and depicting the relationship between holes of the screen and backing plate members.
Figure 16:
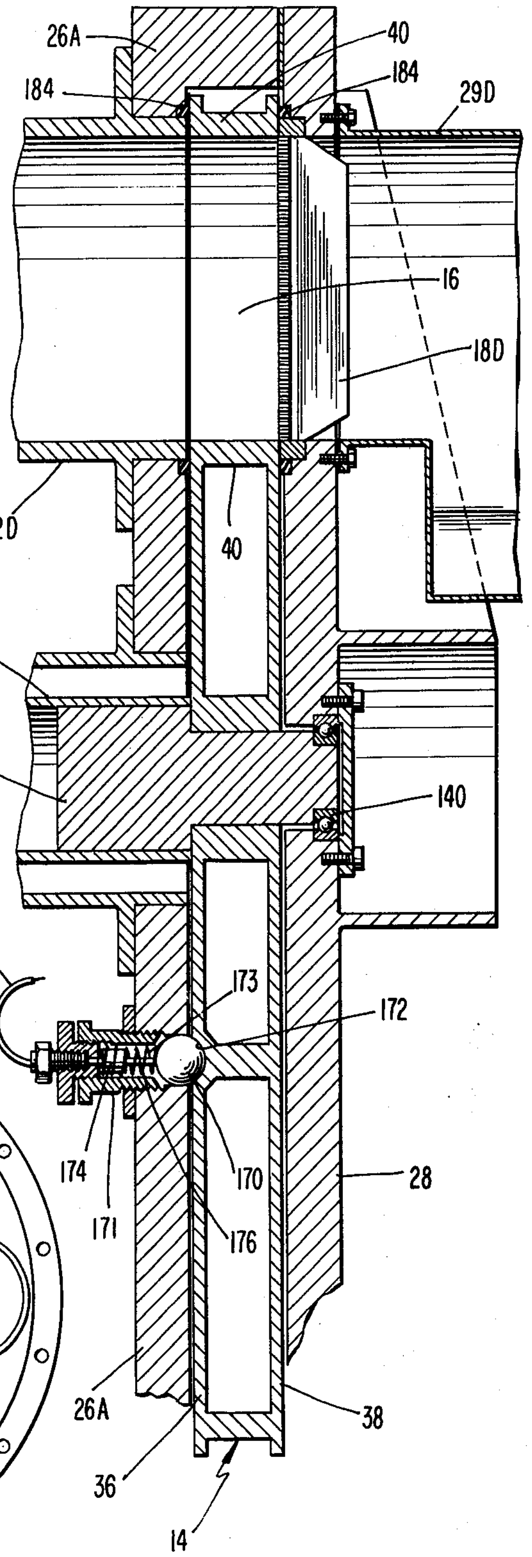
Figure 17:
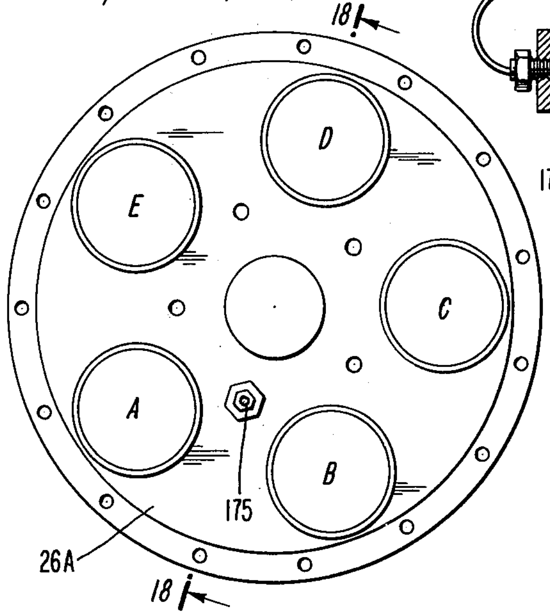
FIG. 17 is an end elevational view of a rotary head component of the juice extracting mechanism.

The second carrier 28 is connected to the inner plate 26A of the first carrier 26 by a plurality of bolts 90. The juice receiving chambers 29A–D of the second carrier 28 are aligned with the extracting stations A–D and each include one of the apertured screens 18A–D (FIGS. 14–16). The formation of those screens 18A–D is similar to that of the screen 56 positioned at the end of the initial compression plunger 13A. That is, each screen 18A–D comprises tapered slots or holes which narrow toward the cells. In FIGS. 14–16 a screen is depicted having a plurality of holes 92. The screen is mounted to the second carrier 28 by a plurality of screws 93. Mounted within the second carrier 28 behind the screen 18A are a plurality of support plates 94.

Each of the chambers 29A–D of the second carrier 28 are arranged to receive and conduct juices which are expressed from vegetable matter within the cells 16. The first chamber 28A includes the discharge conduit 19 which is joined by a conduit 98 from the duct 78 in the tube 42A of the first extracting station A. As will be explained in detail subsequently, full strength juice is conducted by the conduit 19 to a collecting station.

The second chamber 29B includes a discharge conduit 100 which receives and conducts diluted juices to a collecting station.

The third chamber 29C includes an outlet conduit 102 which is connected to discharge into the compartment 42B of the second extracting station B. In similar fashion, the fourth chamber 29D includes an outlet passage 104 which is connected to discharge into the compartment 32C of the third extracting station C.

Connected to discharge into the compartment of the fourth extracting station D is a conduit 106 which conducts imbibition water from a suitable source.

As will be explained hereafter, the imbibition water is first passed through a charge of product at the fourth station D. Such water, together with expressed juices entrained therein, travels to the third station C where it is pressed through a charge of product at the latter to combine with still more juice. Finally, such water-juice mixture (diluted juice) is pressed through a charge of product at the second station B and from thence to the final discharge conduit 100. In this fashion, the imbibition water travels counter to the direction of travel of product through the mechanism, i.e., the water progressively contacts product of a more juice-laden nature.

At the fifth station E, i.e., product discharge station, no screen is provided in the chamber 29E. Consequently, extension of the plunger 13E ejects an exhausted charge of product from the mechanism.

A product insert mechanism 110 is illustrated in FIGS. 1, 2, 19–21 which introduces fresh plant product into the system. The insert mechanism 110 comprises a cylindrical compartment of rectangular cross-section 112 arranged at an inclination relative to vertical and at a right angle relative to the tube 42A of the first station A. A reciprocable pusher element 114 is mounted for reciprocable movement in the compartment 112 toward and away from a lateral opening 116 formed in the tube 42A. If desired, the pusher element 114 can be arc-shaped and of the same diameter as the tube 42A of the first station so as to be able to mate with such tube 42A and thereby close-off the opening 116. A fluid ram 118 is connected to the element 114 for extending and retracting the latter. A hopper 120 is mounted above the compartment 112 and opens downwardly into the latter. Plant material stored within the hopper gravitates into the compartment 112 and is pushed into the tube 46A of the first extracting station A by the pusher element 114.

Figure 1:
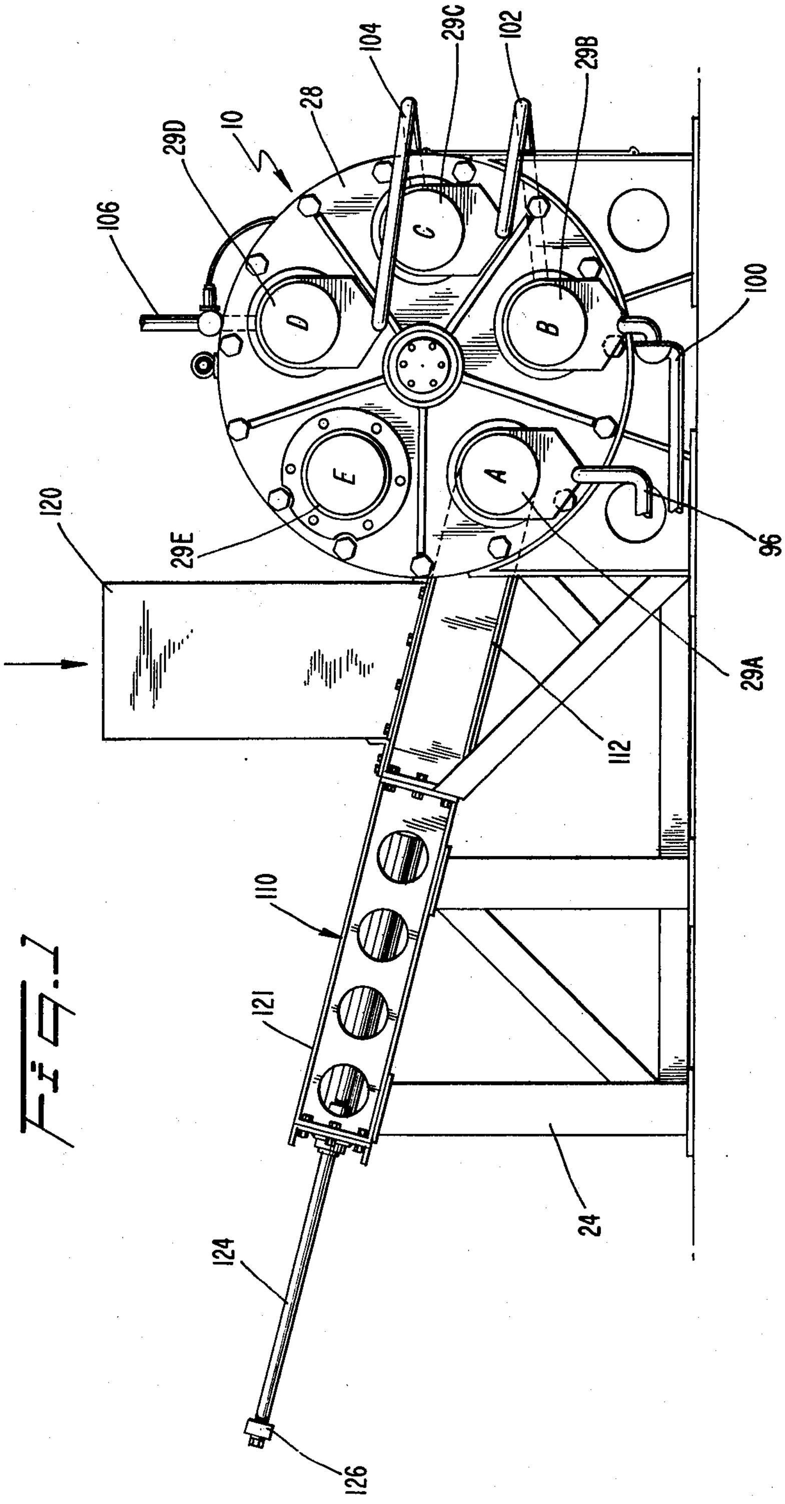
FIG. 1 is a side elevational view of a juice extractor mechanism according to the present invention.
Figure 2:
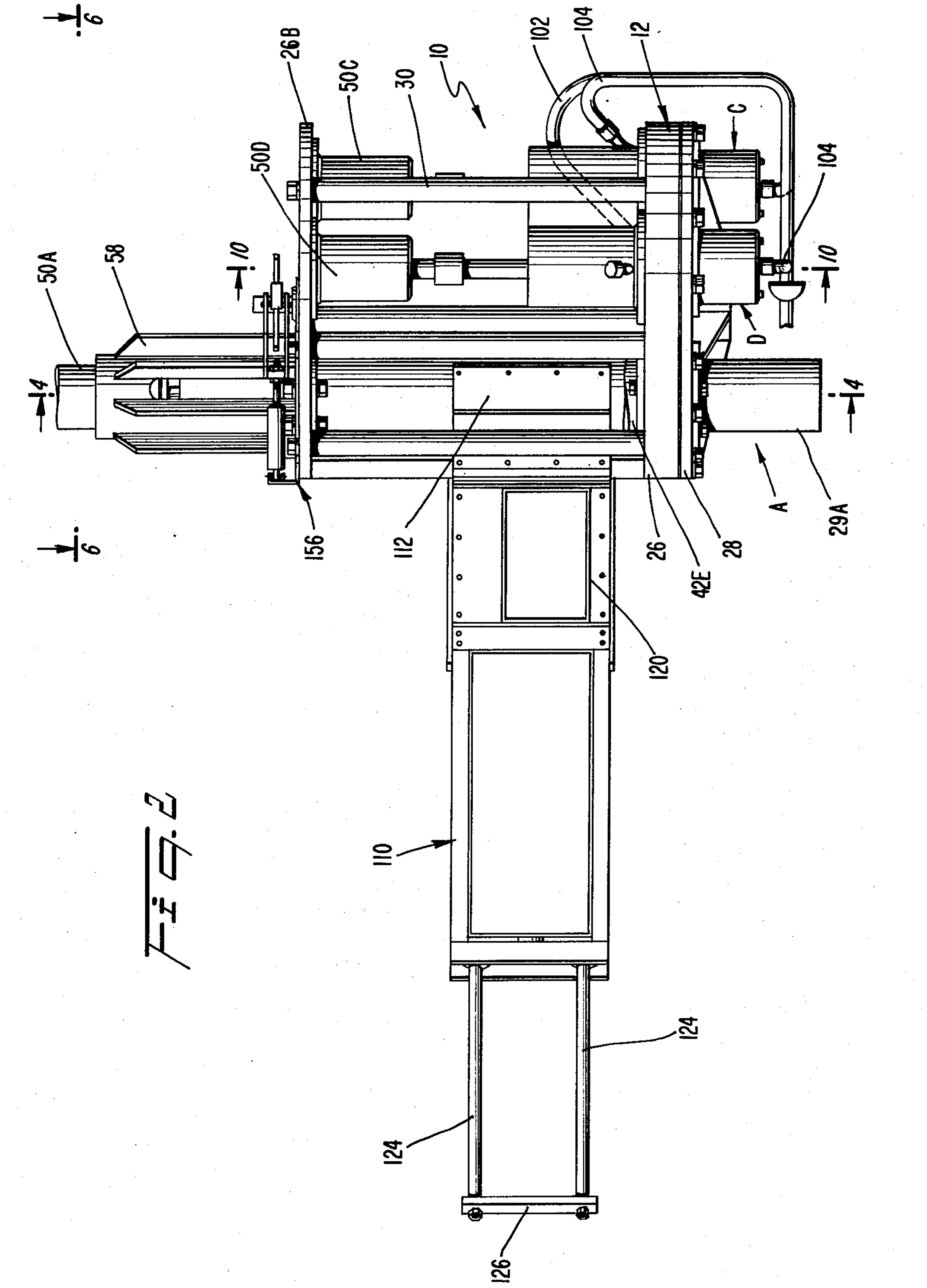
FIG. 2 is a plan view of the juice extracting mechanism with a portion of a discharge station broken away to expose an initial extracting station.

The cylinder end of the fluid ram 118 is connected to a rigid frame 121. The rod end of the fluid ram 118 is connected to a transverse plate 122. The pusher element 114 is secured to the front side of the plate 122. Connected to the backside of the plate 122 are a pair of rods 124 which extend rearwardly through the frame 121 and are joined together at their rearward ends by a stop bar 126 (FIGS. 2, 7). The location of the bar 126 on the rods 124 is adjustable by means of adjustable nuts 128. The bar 126 is positioned so as to contact the frame 121 to limit the extent of the stroke of the ram 118 at the desired point.

A hardened steel edge 130 is provided along the top of the pusher element 114, and a hardened steel edge 132 is positioned at a discharge end of the hopper to minimize wear. Additional wear edges may be disposed along the edges of the opening 116 in the tube 42A to minimize wear.

The pusher element 114 is scoop-shaped to facilitate conveyance of the plant product as well as to close-off the side of the tube 42A.

The hydraulic rams 50A–E are connected to a conventional source of pressurized fluid for simultaneous actuation so that all of the plungers 13A–E are extended and retracted in unison.

The hydraulic ram 118 is connected to a pressurized fluid source so as to be extended prior to the extension of the rams 50A-D. In this manner, plant material is inserted into the tube 46A of the first extracting station A by the pusher element 114, whereupon the latter forms a portion of the side wall of such tube 42A. Thereafter, the first ram 50A is extended to displace the plant material into the associated cell 16 of the rotary head 14 and compresses such material.

A drive shaft 136 is arranged centrally of the rotary head 14. The shaft is connected at one end to a first stub axle 138, the latter being rotatably mounted in bearings 140 situated in the second carrier 28. The other end of the shaft 136 is connected to a second stub axle 152 which is rotatably mounted in bearings 154 situated in the outer plate 26B of the first carrier 26. The head 14 is connected for rotation to the first sub-axle 138.

Figure 22:
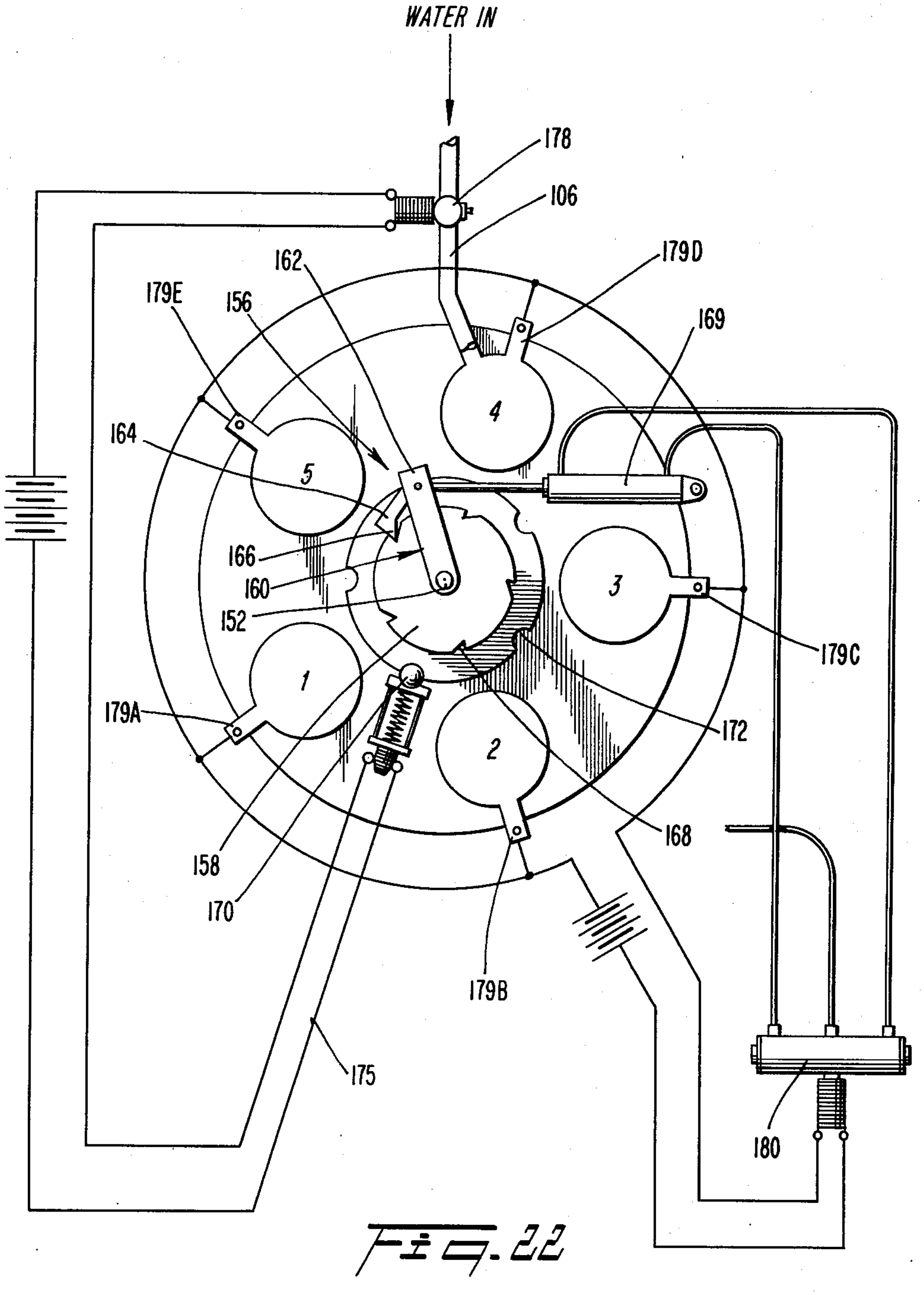
FIG. 22 is an end view of the juice extracting mechanism schematically depicting an indexing system for rotating the rotary head.

Operably connected to the second stub axle 152 is an indexing mechanism 156 (FIG. 22) which comprises an indexing disc 158 fixedly secured to the second stub axle 152. Rotatably mounted on the second stub axle is a yoke 160 which includes a pair of legs 162 arranged to straddle the indexing disc 160. Pivotably connected to the yoke 160 is a finger 164 which includes a projection 166. The indexing disc 158 includes a plurality of notches 168 around the outer periphery thereof which correspond in quantity and location to the quantity and location of the stations A to E.

A fluid ram 169 has its rod end connected to an adapter bar, and the latter is connected to the yoke 160 so that the ram, by extension and retraction actions, can oscillate the finger 1 around the rotary axis 34. When the finger 164 is rotated in a "re-set" direction (i.e., clockwise in FIG. 22), the projection is free to leave a notch 168 and enter the next notch 168. When the finger 164 is thereafter driven in the opposite direction (i.e., "indexing" direction), it rotates the indexing disc 158, and thus the rotary head 14, to realign each of the cells 16 with the compartments 32 and chambers 29 of the respective subsequent stations.

Mounted on the inner plate 26A of the first carrier 26 is a retainer device (illustrated in FIG. 18 and schematically depicted in FIG. 22) which includes a spring-biased ball 170 which is provided with a plurality of recesses 172 arranged in a circular array for contact by the ball 170. The recesses 172 correspond in quantity and spacing to that of the stations A–E so that whenever the cells 16 become aligned with the next respective station during an indexing step, the ball 170 enters the next recess 172 and retains the head 14 in that position. Of course, the stroke of the indexing ram 169 is so arranged that the indexing disc 158 will be rotated just enough to displace the cells 16 to the next respective stations. The ball 170 will hold the rotary head such that the cells are accurately aligned with the stations, until a subsequent indexing step is initiated, whereupon the ball will be dislodged from the recess, as discussed below.

Mounted in a housing 171 behind the ball is a valve switch 174. The switch 174 comprises an electrical switch 175 which has a plunger 176 biased into contact with the ball 170. A compression spring 173 in the housing 171 yieldably biases the ball 170 toward the head 14. The switch 174 is electrically connected to a solenoid operated valve 178 via line 175 which controls the delivery of imbibition water to the fourth compartment 32D. It is desirable that the flow of imbibition water to the compartment of the fourth station D not occur while the rotary head 14 is being rotatably indexed to the next position. Therefore, when the ball 170 is displaced away from the rotary head 14 during indexing travel of the latter, the plunger 176 will be depressed to activate to energize the valve 178 and close the latter. Thereafter, when the ball 170 enters the next recess 172, the valve 178 will be opened and imbibition water will be introduced into the compartment 32D of the fourth station D.

When the plunger 13D is extended, the skirt 36D will close-off the conduit 106 and prevent entry of imbibition liquid during the compression of a charge of plant material. A similar effect takes place in the second and third stations B, C wherein the liquid inlet conduits 102, 104 are blocked by the skirts of the rams 13B, 13C so that imbibition liquid enters the associated compartments only after the rams have been retracted.

A plurality of microswitches 179 are suitably provided at each station A–E so as to be activated (or de-activated if desired) when the plungers 13A–E are in a fully retracted condition. The microswitches 179A–E are electrically coupled to a solenoid actuated fluid valve 180 which controls the delivery of fluid to the indexing ram 169. Only when all of the plungers 13A–E are in a retracted state does the valve 180 deliver fluid to the indexing ram 169. In this fashion, it is assured that the plungers 13A–E will be clear of the cells 16 in the rotary head 14 prior to rotation of the latter.

Figures 19, 20, 21:
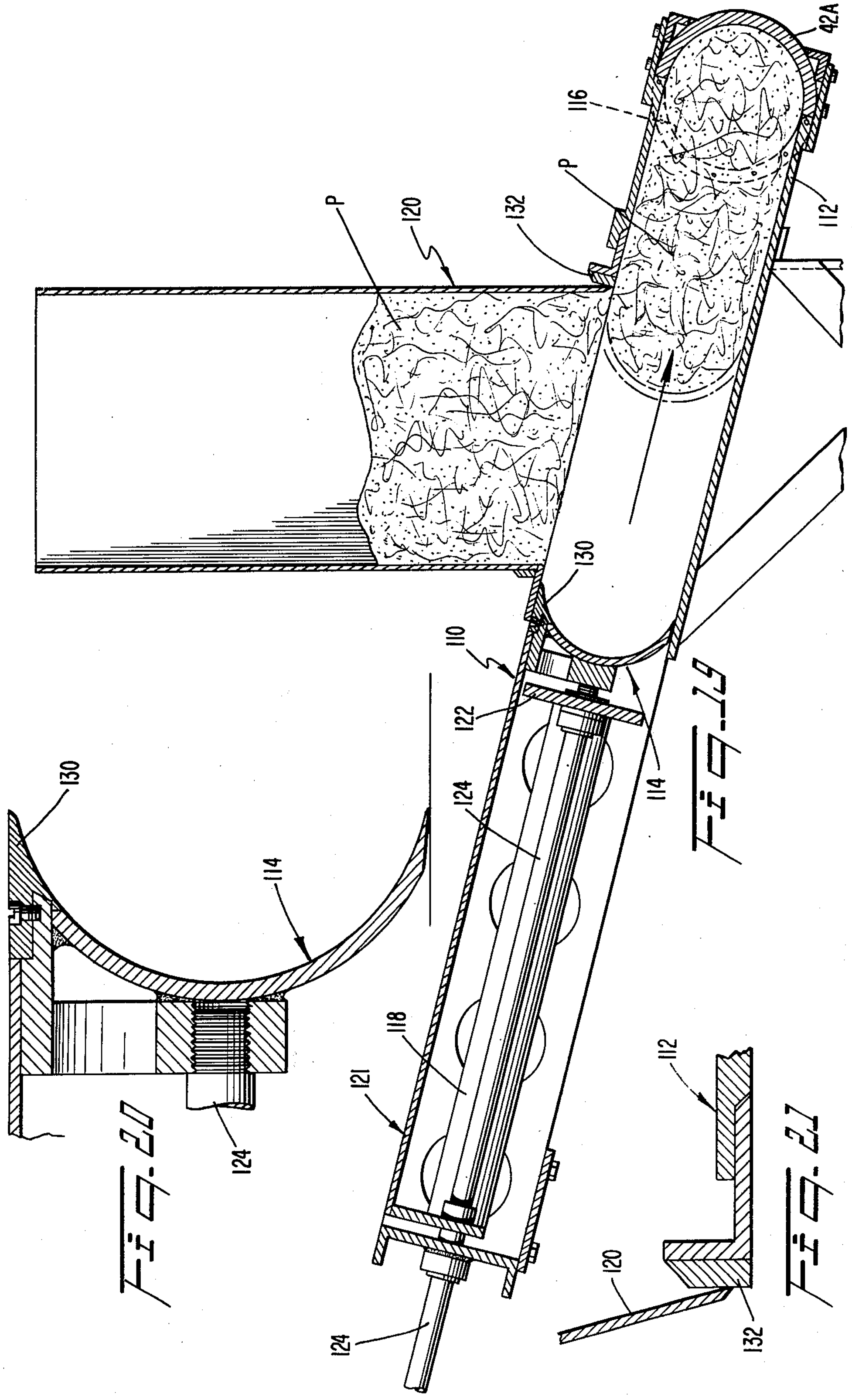
FIG. 19 is a longitudinal sectional view taken through the product inserting mechanism.
FIG. 20 is an enlarged view of a pusher element of the inserting mechanism.
FIG. 21 is an enlarged view of a discharged end of a product hopper.

IN OPERATION, the carrier head 14 is initially indexed so that the cells 16 thereof are aligned with respective ones of the extracting and discharge stations A–E. A load of plant material P is provided within the hopper 120 (FIG. 19). The fluid ram 118 is actuated to extend the pusher element 114 to insert a charge of plant material P into the tube 42A of the initial extracting station A ahead of the initial plunger 13A. Thereafter, the hydraulic system is actuated to simultaneously extend all of the plungers 13A–E. The initial plunger 13A pushes the charge of plant material into that cell 16 of the rotary head 14 which is aligned with the first station A. Accordingly, the charge of plant material is compressed between the screen 18A on the second carrier 28 and the screen-like compression wall 44A of the first plunger 13A. Consequently, juices are expressed from the plant material and flows through both screen members 18A, 44A. The ability of the juice to flow in either direction maximizes the rate of juice extraction and reduces the resistance to compression. That is, no portion of the juice is required to travel through more than about one-half the thickness of the charge. Juices flowing through the screen 18A flow into the discharge conduit 19, while juices flowing through the screen 44A flow through the interior of the plunger 13A and discharge through the outlet opening 76 into the conduit 98, the latter merging with the discharge conduit 19 to conduct full strength juices from the system.

After the plant material has been fully compressed, the plungers 13A–E are simultaneously retracted. Thereafter, the indexing ram 169 (FIG. 22) is actuated to index the drive shaft 136 of the rotary head to locate the cells 16 in alignment with successive ones of the stations A–E. Thus, the cell which had previously been entered by the initial plunger 13A is now aligned with the second extracting station B, and so on.

Now the pusher element 114 is extended to introduce a fresh charge of plant material into the tube 42A of the initial extracting station. Thereafter, the extractor plungers 13A–E are extended so that the plungers 13A, B of the first and second extracting stations A, B compresses the respective charges of plant material therein. At the second station B, juices are expressed through the second backing screen 18B and flow through the outlet 100. This procedure is repeated at the third and fourth extracting stations C, D. At the fourth extracting station D, imbibition water is introduced through the conduit 106 into the tube 42D ahead of the fourth extractor plunger 13D prior to extension of the plunger via control signs from the switch 174. Accordingly, when the plunger 13D is extended the imbibition water is forced through the charge of plant material, mixes with juices entrained therein, and is discharged through the apertured screen backing 18D. The expressed water/juice mixture is conducted by the conduit 104 to the tube 42C of the third extracting station. Entry of the liquid into the tube is temporarily blocked by the presence of the third extractor plunger 13C and is allowed after the plungers have been retracted. Retraction of the plungers actually creates a suction which draws-in the liquid. During a subsequent extension of the plungers, the third plunger 13C forces the water/juice mixture through the plant material and through the backing screen 18C. As a result, the juice concentration in the mixture is increased. This new water/juice mixture is conducted by the conduit 102 to the tube 42B of the second station B. Upon a subsequent extension of the plungers, the water/juice mixture is forced through the plant material in the second station B and through the backing screen 18B to be conducted away via line 100.

It will be appreciated that as the charge of plant material travels through the second and third extracting stations B–C, it is acted upon by a water/juice mixture of progressively decreasing juice concentration. By the time that the extracting step of the fourth station has occurred utilizing fresh imbibition water, the plant material has been substantially exhausted of juices. Accordingly, at the fifth station E, i.e., the discharge station, the discharge plunger 13E simply pushes the exhausted charge of plant material through the outlet chamber 29E where it is suitably collected.

Seal rings 182 (FIG. 10) are positioned in each of the rams 13A–E to prevent leakage of liquid therearound. Seal rings 184 (FIG. 18) are also provided in the first and second carriers 26, 28 around the ends of the compartments 32 and chambers 29, to create a fluid seal around each cell 16 to prevent leakage of liquid between the carriers 26, 28 and the rotary head 14.

The tapering nature of the apertures 60, 92 in the backing screens 18 carried by the second carrier and the first extractor plunger 13A minimizes jam-ups which could otherwise occur as plant solids, such as fibers for example, enter the apertures. Since the cross-sectional area of the apertures increases in a direction away from the cells, the solids cannot become bunched or jammed between the walls of the apertures as juice is expressed through the apertures behind the solids.

It will be appreciated that the methods and apparatus according to the present invention facilitate the extraction of juices from plant material in an efficient and effective manner. Charges of plant material are quickly transported through a series of compressing steps whereby juices are forcefully expressed and collected. Imbibition liquid is pressed through the plant material at a plurality of the stations to intensify the juice extraction action. Compression of the plant material and passage of imbibition liquid are produced simultaneously by a single plunger, thereby simplifying the nature and expense of equipment needed.

The screen-like compression face of the initial extractor plunger 13A, utilized in conjunction with a screen-like back-up or support member 18A, provides a double escapement route for juices from the plant material, thereby facilitating the rate of juice expression and minimizing the forces required for such expression.

The tapered nature of the apertures in the screen-like elements 18A–D, 44A minimizes the chances for blockage and jam-ups to occur within the screens.

The scoop-shaped charge feeding element 114 facilitates conveyance of plant material and closes off an opening in the initial plunger chamber.

Although the invention has been described in connection with a preferred embodiment thereof, it will be appreciated by those skilled in the art that additions, modifications, substitutions and deletions not specifically described may be made without departing from the spirit and scope of the invention as defined in the appended claims.

What is claimed is:

1. Apparatus for extracting juice from plant material comprising:
   - carrier means defining a plurality of circumferentially spaced extracting stations and including a reciprocable compression members at each extracting station;
   - a rotary head mounted for rotation relative to said carrier means and including a plurality of cells alignable with said extracting stations, said cells each being arranged to carry a charge of plant material;
   - indexing means for rotating said head in step-by-step fashion to sequentially align said cells with successive ones of said extracting stations;
   - means for extending said compression members into compressing relationship with plant material in said cells to express juice from such material; and
   - conduit means connected to at least some of said extracting stations for introducing imbibition liquid ahead of the respective compression members to be pressed through the plant material during extension of such compression members.

2. Apparatus according to claim 1, wherein said carrier means further comprises a discharge station and a reciprocable discharge member at said discharge station for discharging exhausted plant material from said apparatus.

3. Apparatus according to claim 2, wherein said carrier means comprises first and second stationary carriers forming a space therebetween, said rotary head disposed in said space, said first carrier carrying said compression members; said second carrier including an apertured backing screen at each of said extracting stations to support plant material as it is compressed in a respective cell.

4. Apparatus according to claim 3, wherein said first carrier carries a plurality of tubes at each of said extracting and discharge stations, said tubes extending parallel to the axis of rotation of said rotary head, said compression members and discharge member comprising a plurality of plungers reciprocably mounted in respective ones of said tubes, said extending means comprising motor means operably connected to said plungers.

5. Apparatus according to claim 4, wherein one of said plungers arranged as the first plunger for contacting each charge of plant material includes an apertured compression surface and an internal conduit, such that at least some of the juice expressed from the plant material flows through such plunger.

6. Apparatus according to claim 5, wherein the apertures of said backing screen and apertured compression surface are tapered so as to become wider in a direction away from said rotary head, to facilitate removal of plant solids.

7. Apparatus according to claim 4, wherein said motor means comprises a plurality of fluid actuated motors connected to respective ones of said plungers for simultaneous extension and retraction.

8. Apparatus according to claim 1, wherein at least one of said conduit means is connected to receive juices from one station and conduct such juices to another station to be pressed through plant material at the latter.

9. Apparatus according to claim 8, wherein said other station constitutes a station which receives a charge of plant material before said one station, such that the imbibition liquid travels through the apparatus in reverse direction relative to the plant material.

10. Apparatus according to claim 1, including valve means for controlling the entry imbibition liquid, and means for sensing rotary movement of said rotary head and closing said valve means to prevent the introduction of imbibition liquid while said head is rotating.

11. Apparatus according to claim 10, wherein said sensing means comprises an electrical switch mounted on said carrier means and connected to said valve means, said switch including a movable plunger, a ball engaged by said plunger and urged toward said rotary head to engage spaced recesses therein when said rotary head is at rest, said ball being forced out of said recess when said rotary head rotates, to displace said plunger on said switch.

12. Apparatus according to claim 4, including a hopper for storing plant material, means disposed below said hopper for introducing plant material from the hopper into said tube of an initial one of said extracting stations for insertion into a respective cell by the plunger associated with said initial station.

13. Apparatus for extracting juice from plant material comprising:

carrier means defining a plurality of circumferentially spaced extracting stations and including a reciprocable plunger at each extracting station;

a rotary head mounted for rotation relative to said carrier means and including a plurality of cells alignable with said extracting stations, said cells each being arranged to carry a charge of plant material;

said carrier means carrying a plurality of tubes at each of said extracting stations, said tubes extending parallel to the axis of rotation of said rotary head, said plungers being reciprocably mounted in respective ones of said tubes, indexing means for rotating said head in step-by-step fashion to sequentially align said cells with successive ones of said extracting stations;

motor means operably connected to said plungers for extending said plungers into compressing relationship with plant material in said cells to express juice from such material;

a hopper for storing plant material; and means disposed below said hopper comprises a pusher element mounted for reciprocation toward and away from an opening in a side wall of the tube associated with an initial extracting station for inserting a charge of plant material into said last-named tube; said pusher element being configured in a manner corresponding to said side wall of said last-named tube to form a portion of said side during subsequent extension of said plunger associated with said last-named tube.

14. Apparatus according to claim 1, wherein said compression surfaces comprise a plurality of plungers, one of said plungers being arranged as the first plunger to contact a charge of plant material, the compression surface of said one plunger being perforated to conduct expressed juices therethrough; said one plunger defining means conducting juices from said perforated compression surface to an outlet.

15. Apparatus according to claim 1, including means communicating with at least some of said stations for introducing imbibition liquid therein for being forced through the plant material by the respective compression surfaces.

16. Apparatus according to claim 1, wherein said carrier means carries a perforated backing screen at each of said extracting stations disposed on a side of the cell opposite said reciprocable compression surface so that the latter compresses plant material against the associated backing screen and expresses juice therethrough.

17. Apparatus for extracting juice from plant material comprising:

carrier means carrying a plurality of movable compression members forming a plurality of stations;

said compression members each being movable between a compression position and a rest position;

head means including a plurality of cells for receiving plant material;

indexing means effecting relative movement between said carrier means and said head means to sequentially position said cells at successive ones of said stations;

means for moving said movable compression members into their compression positions in pressing relationship with plant material in the respective cells to express juice therefrom; and conduit means connected to at least some of said stations for introducing imbibition liquid ahead of the respective compression members to be pressed through the plant material during extension of such compression members.

18. Apparatus for expressing juice from plant fibers comprising a cell for receiving a charge of plant material, and a movable member arranged for entering said cell and compressing the plant material therein to express juice, said movable member comprising a compression surface in the form of an apertured screen which admits passage of juice, said movable member having an interior passage for conducting juice from said screen to a discharge opening, the apertures of said screen being tapered so as to become wider in a direction away from said cell, to facilitate removal of plant solids.

19. Apparatus according to claim 18, including a support member disposed at an end of said cell opposite said movable member, said support member comprising an apertured screen for admitting passage of juice.

20. Apparatus for expressing juice from plant material comprising a stationary tube, a plunger mounted for reciprocable movement in said tube, a head mounted for movement relative to said head and comprising a plurality of cells arranged to carry charges of plant material and to be sequentially aligned with said tube upon movement of said head so that said plunger may compress the plant material; means for introducing plant material into an opening in a side of said tube ahead of said plunger comprising a pusher member mounted for reciprocable movement toward and away from said opening; said pusher element configured in a manner corresponding to said tube to define a portion of said side during subsequent movement of said plunger toward the associated cell.

21. Apparatus for extracing juice from plant material comprising:

carrier means comprising first and second spaced apart carriers;

said first carrier comprising a plurality of reciprocable plungers arranged in circumferentially spaced relation;

said second carrier comprising a plurality of apertured screens aligned with all but one of said plungers to form extracting stations therewith, said one station defining a discharge station;

a rotary head disposed between said first and second carriers, said rotary head mounted for rotation about an axis which is concentric relative to said stations, said head including a plurality of open-ended cells which correspond in quantity and mutual spacing to said extracting and discharge stations so that said cells can be aligned with respective ones of said stations, said cells being arranged to carry charges of plant material;

first motor means for moving said plungers simultaneously into the associated cells such that plant material at said extracting stations is compressed, with the juices thereof flowing through said screens, and such that plant material in said discharge station is ejected, and for moving said plungers away from said cells;

second motor means for rotating said rotary head following movement of said plungers away from said cells to align each cell with a succeeding station;

means for introducing imbibition liquid into one of said extracting stations to be pushed through the plant material by the plunger at such station, and conduit means at said last-named station for conducting expressed juice and imbibition water to the preceeding station for introduction into the latter.

22. Apparatus according to claim 21, wherein said initial plunger comprises a compression face in the form of an apertured screen for admitting juice therethrough, and an internal passageway for conducting such admitted juices.

23. A method of extracting juice from plant material comprising the steps of:

rotating a rotary head in step-by-step fashion such that circumferentially spaced plant material-carrying cells thereof become aligned successively with expressing stations on a stationary carrier;

moving movable members at said expressing stations into compressing relationship with plant material in said cells at each successive step of said head, to express juice from the plant material;

introducing imbibition liquid into one of said stations, thereafter moving the movable member associated with said one station into compressing relationship with plant material at said station while forcing said imbibition liquid through such plant material to mix the latter with plant juice, and introducing the resultant liquid/juice mixture into another of stations which receives each charge of plant material before said one station; and discharging exhausted plant material from its associated cell at a discharge station.

* * * * *